United States Patent [19]

Nagata et al.

[11] Patent Number: 5,188,693
[45] Date of Patent: Feb. 23, 1993

[54] PROCESS FOR APPLYING POLYVINYL CHLORIDE SEALING MATERIAL HAVING LOW THIXOTROPIC INDEX

[75] Inventors: Nobuyuki Nagata, Okazaki; Itsuro Tsutsui, Anjyou; Koji Ota; Hirofumi Hashimoto, both of Toyota; Haruji Shibata, Okazaki, all of Japan

[73] Assignees: Aishin Kakou K.K.; Toyota Jidosha K.K., both of Aichi, Japan

[21] Appl. No.: 725,924

[22] Filed: Jul. 5, 1991

Related U.S. Application Data

[63] Continuation of Ser. No. 310,017, Feb. 13, 1989, abandoned, which is a continuation of Ser. No. 39,870, Apr. 20, 1987, abandoned.

[30] Foreign Application Priority Data

| Apr. 18, 1986 | [JP] | Japan | 61-90820 |
| Apr. 18, 1986 | [JP] | Japan | 61-90821 |
| Apr. 18, 1986 | [JP] | Japan | 61-90822 |

[51] Int. Cl.$^5$ ............................................. B29C 65/54
[52] U.S. Cl. .......................... 156/244.11; 156/244.22; 156/244.25; 156/305; 264/259; 264/263; 524/314
[58] Field of Search ............ 156/244.11, 244.22, 156/244.25, 305; 264/263, 259; 524/314, 569, 236, 425

[56] References Cited

U.S. PATENT DOCUMENTS

| 3,008,862 | 11/1961 | Haine et al. | 156/244.22 |
| 3,627,707 | 12/1971 | Giessler et al. | 524/314 |
| 3,802,987 | 4/1974 | Noll | 156/244.22 |
| 3,880,794 | 4/1975 | Iida et al. | 524/568 |
| 3,893,777 | 7/1975 | Jones | 264/263 |
| 3,893,956 | 7/1975 | Brandt | 524/211 |
| 4,035,212 | 7/1977 | McRitchie | 156/244.25 |
| 4,278,718 | 7/1981 | Billings et al. | 524/569 |
| 4,358,499 | 11/1982 | Hill | 427/411 |
| 4,434,076 | 2/1984 | Mardis et al. | 524/236 |
| 4,440,900 | 4/1984 | Burba et al. | 524/569 |
| 4,581,413 | 4/1986 | Kim | 524/222 |
| 4,643,863 | 2/1987 | Martini | 264/275 |

FOREIGN PATENT DOCUMENTS

| 2840996 | 3/1979 | Fed. Rep. of Germany | 524/569 |
| 3113692 | 10/1982 | Fed. Rep. of Germany | 524/569 |
| 660361 | 11/1951 | United Kingdom | 524/425 |
| 1011961 | 12/1965 | United Kingdom | 524/425 |

*Primary Examiner*—Jan H. Silbaugh
*Assistant Examiner*—Brian J. Eastley
*Attorney, Agent, or Firm*—Sughrue, Mion, Zinn, Macpeak & Seas

[57] ABSTRACT

A sealing material includes a polyvinylchloride type resin as a major ingredient, a plasticizer, a thixotroping agent, a powdery filler, an adhesive promoter, and a heat stabilizer, and has a viscosity at the low shearing speed of 12,000 to 20,000 cps and a ratio of the viscosity at the low shearing speed to the viscosity at the high shearing speed of 1.5 to 2.5. The sealing material is suitably applied to gap between steel plates joined to each other by a non-contact way.

Preferred polyvinylchloride type resin is a blend of a particulate resin having a mean particle size of 2 to 3 μm mixed with a particulate resin having a mean particle size of 20 to 30 μm at a mixing weight ratio of 1:1 to 3:1. Preferably, the plasticizer is a high molecular plasticizer, and the powdery filler is one having an oil absorption of 40 to 50 cc/100 g.

15 Claims, 2 Drawing Sheets

PROCESS FOR APPLYING POLYVINYL CHLORIDE SEALING MATERIAL HAVING LOW THIXOTROPIC INDEX

This is a continuation of application Ser. No. 07/310,017 filed Feb. 13, 1989, now abandoned, which is a continuation of application Ser. No. 07/039,870 filed Apr. 20, 1987, now abandoned.

A. FIELD OF THE INVENTION

The present invention relates to a sealing material applied for sealing a gap formed between steel plates joined to each other to be used in motor vehicles and so forth, and particularly to a sealing material which is suitably applied for such sealing operation by use of a robot.

B. BACKGROUND OF THE INVENTION

Conventionally, for joining of steel plates to be used in the car body of motor vehicles and so forth, the steel plates are spotwelded to each other, and the joint zone is applied with a sealing material of viscous resin so as to close the gap between the steel plates in the joint zone. In the sealing operation, a gun is moved by hand along the joint zone with the sealing material discharged through the nozzle of the gun. Otherwise, the sealing operation utilizes a robot which moves following a set program for the sealing operation.

In such manual sealing operation, the nozzle of a gun is brought into contact with a sealing-application work (the joint zone between steel plates) so that the gun can be moved following to the feature of the sealing-application work with the aid of visual observation of the work of the steel plates and also with the aid of feeling of a touch to the sealing-application work through the gun. Accordingly, typically as shown in FIG. 7, a gun nozzle 8 can be moved in contact with the joint zone of two steel plates 1, 2 joined through spot welded portions 3, 4, following the features of the joint zone having convex portions 5, 6. Thus manual sealing-application is carried out by a contact way. In this case, the gun nozzle 8 employs a relatively large aperture, and a sealing material 10 is discharged through the gun nozzle 8 directly to the sealing-application work. Accordingly, the shearing speed of the discharged sealing material is relatively low, which enables the joint zone applied with the sealing material to have an aesthetical appearance.

On the other hand, in the above-mentioned sealing operation by use of a robot, it is impossible for the robot to meet all situations of the joint zone as flexibly as the manually operated gun. Even a slight error in the accuracy of the convex portions 5, 6 interferes the movement of the gun of the robot. For elimination of such interferences in the robot sealing operation, it has been attempted to position the gun nozzle 8 at a distance to the sealing-application work 1 and 2. Therefore, the discharge rate of the sealing material needs to be increased as compared with that in the manual sealing-application. For this purpose, a nozzle having a relatively small aperture is employed for the gun.

Namely, in the robot sealing operation where the gun is moved by the above-mentioned non-contact way, the sealing material of viscous resin discharged through the nozzle having a relatively small aperture is made to run through the space from the gun nozzle to the sealing-application work. This requires the shearing speed of the sealing material to be considerably increased at the discharge as compared with that in the above-mentioned manual application by a contact way. In use of a sealing material having such a low viscosity at high shearing speed as that of a sealing material used in the manual application by a contact way, the joint zone applied with the sealing material is deficient in appearance and sealing-property.

In the case that a broad joint zone is applied with a sealing material, the gun is positioned at a distance to the sealing-application work 1 and 2, at an inclination ($\theta$) of the gun nozzle to the advancing direction, as shown in FIG. 4. Then, the gun is advanced while the sealing material 10 discharged through the gun nozzle is blown against the work to form a broad application zone. In use of a sealing material having a relatively low viscosity at the high shearing speed for application to a broad joint zone, the sealing material is splashed against the sealing-application work, often resulting in formation of an exposed portion of the beads 13a where the sealing material is excessively spread, as shown in FIG. 6, and the joint zone edges are insufficiently covered with the sealing material. For elimination of such problems, it has been attempted simply to decrease the viscosity of the sealing material. In the case of a broad joint zone applied with such a low viscous sealing material, the sealing-application properties are improved. However, in application of such sealing material to a narrow joint zone, the beads of the narrow joint zone lack in the surface-smoothness, undesirably.

SUMMARY OF THE INVENTION

It is therefore an object of the invention to provide a sealing material of high sealing performance which is suitably applied by a robot operation system to form a smooth finished surface with no exposed, concave and convex portions in the surface, whether the application zone is broad or narrow.

The present invention is based on the discovery that the above purposes can be accomplished by a novel sealing material comprising a vinylchloride type resin as a major ingredient, a plasticizer, a thixotroping agent, a powdery filler, an adhesive promoter, and a heat stabilizer, and having a viscosity of 12,000 cps to 20,000 cps at the low shearing speed at 20° C. and a ratio of the viscosity at the low shearing speed to that at the high shearing speed of 1.5 to 2.5.

The present sealing material, when applied to a narrow joint zone of two steel plates joined to each other, by such a non-contact way as above-mentioned, provides the joint zone with a smooth finished-surface, and also when applied to a broad joint zone, presents high sealing properties to the joint zone. Accordingly, the present sealing material is suitably applied by a robot operation system.

BRIEF DESCRIPTION OF THE DRAWING

FIGS. 5 and 6 are views illustrating an appearance of a broad application zone in which an exposed portion is designated by reference number 13a.

DETAIL DESCRIPTION OF THE INVENTION

Figure 1:
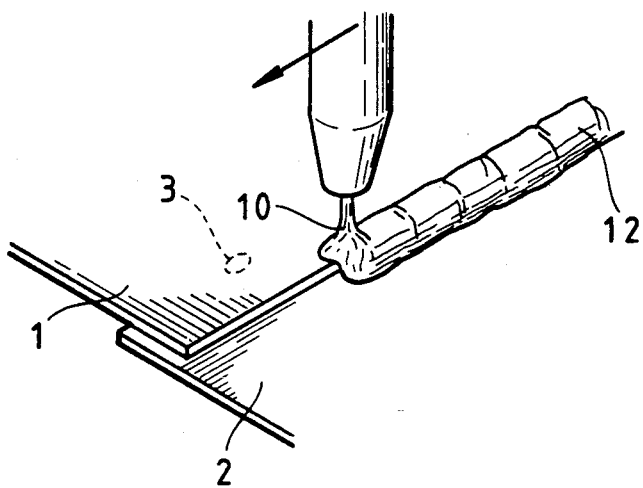
FIG. 1 is a perspective view illustrating that the present sealing material is applied to a narrow application zone by a non-contact way, in which steel plates are designed by reference numbers 1, 2, a spot welded portion by reference number 3, and the feature of the sealing material applied to the narrow application zone by reference number 12.

Examples of the polyvinyl chloride type resin useful as a major ingredient of the present sealing material are polyvinylchloride, copolymers having vinylchloride groups in the polymer chain such as copolymers of vinylchloride with vinylacetate, vinylidene chloride, acrylates, maleic anhydride, or with maleic acid, and the polymer blends thereof. Preferably, the polyvinylchloride type resin constituting a main ingredient of the present sealing material is a blended resin of a fine-particulate raw-resin having a mean particle size of between 2 and 3 $\mu$m mixed with large-particulate raw resin having a mean particle size of 20 to 30 $\mu$m at a mixing weight ratio of 1:1 to 3:1

Plasticizers useful in the present sealing material may be low or high molecular. Preferred low molecular plasticizers include di-2-ethylhexylphthalate, isodecylphthalate, butylbenzylphthalate, di-2-ethylhexyladipate and the like. Preferred high molecular plasticizers include polyesters of phthalic and adipic types, esters of trimellitic and pyromellitic types, and the like. For accomplishing the purposes of the invention effectively, high molecular plasticizers, particularly polyesters of adipic type, are preferred. It is preferred that the amount of the plasticizer used in the invention is in the range of 20 to 40 weight % based on the total weight of the sealing material. The viscosity of the sealing material may be adjusted by the amount of the plasticizer.

Preferred thixotroping agents include ultrafine particulate calcium carbonate, organic bentonites, and the like, which may be added as a single or a mixed ingredient. The amount of the thixotroping agents is preferably in the range of 5 to 15 weight % based on the total weight of the sealing material. The inclusion of the thixotroping agent is effective to render a thixotropic fluidity to the sealing material, and facilitates the application work of the sealing material.

It is preferred that the mean particle size of the thixotroping agent is below about 2 $\mu$m. The inclusion of the thixotroping agent having a mean particle size above about 2 $\mu$m less contributes to the thixotropic fluidity of the sealing material.

Present sealing material contains a powdery filler which serves for reducing the sealing material cost, and functions as a viscosity adjusting agent. Preferred powdery fillers include calcium carbonate, clay, talc, silica, and the like. It is preferred that the amount of the powdery filler is 25 to 50 weight %. The present powdery filler may be untreated or treated with an aliphatic acid for reduction in the oil absorption to about 30 cc/100 g so that the powdery filler can be inhibited from absorbing the plasticizer. A powdery filler having an oil absorption of 40 to 50 cc/100 g, particularly, a calcium carbonate filler having an oil absorption of 40 to 50/100 g, untreated for control of the oil absorption is preferred.

An adhesive promoter useful in the invention is an amine type compound. Examples of the amine type compound are polyamide resins which are condensates of polymerized aliphatic acids and diamines. The amount of the adhesive promoter is preferably in the range of 0.5 to 3 weight % based on the total weight of the sealing material. The adhesive promoter contributes to enhancement of the adhesive property of the sealing material to a steel plate.

Heat stabilizers useful in this invention include inorganic or organic acid salts of barium, zinc, tin, lead, calcium and the like. Typically, lead sulfite, lead carbonate, barium laurate, zinc laurate, and the like are exemplified as the heat stabilizer. The amount of the heat stabilizer at 0.5 to 5 weight % is effective for inhibiting the polyvinylchloride type resin contained as the major ingredient from being decomposed and releasing hydrochloric acid therefrom at high temperature.

The present sealing material has a viscosity of the same order (12,000 to 20,000 cps) as that of conventional one suitable for the sealing-application by a contact application way, but the thixotropic index (hereinafter, referred to as TI) is in the range of 1.5 to 2.5. The TI is lower as compared with that of conventional sealing material suitable for the sealing application by a contact way, which has a TI above 3. That is, the present sealing material has a viscosity of the same order as that of conventional one at low shearing speed, but a high viscosity at high shearing speed. More preferably, the viscosity at low shearing speed is in the range of 13,000 to 19,000, and the TI is in the range of 1.6 to 2.4.

In this patent application, the viscosities at low and high shearing speeds mean viscosities at the shearing speed of 62 sec$^{-1}$ and 860 sec$^{-1}$, measured at 20° C., correspondingly. The TI is expressed by the following formula:

$$TI = \frac{\text{viscosity at low shearing speed}}{\text{viscosity at high shearing speed}}$$

The sealing material of the present invention composed as above-mentioned and having a predetermined viscosity and a TI, eliminates formation of an exposed portion of the beads when the sealing material discharged through a gun nozzle is run through the space from the nozzle to a sealing-application work by a non-contact application way, due to the high viscosity at the high shearing speed. Moreover, the beads covered with the sealing material is prevented from lacking in the surface-smoothness, since the viscosity of the sealing material is kept at a low value while subjected to the low shearing speed.

As described hereinbefore, when the sealing material of the present invention is applied to a joint zone of steel plates by a non-contact way, a smooth finished-surface is obtained in the case of a narrow application zone, and an exposed portion of the beads is eliminated in the case of a broad application zone. The sealing material of the invention having such high sealing properities is suitable for the sealing application by use of a robot.

The preferred embodiments of the invention are as follows.

1) A sealing material characterized in that a major ingredient of the sealing material is a blended polyvinylchloride type resin of a particulate polyvinylchloride type resin having a mean particle size of 2 to 3 $\mu$m mixed with a particulate polyvinylchloride type resin having a mean particle size of 20 to 30 $\mu$m at a mixing weight ratio of 1:1 to 3:1.

2) A sealing material including a plasticizer, characterized in that the plasticizer is a high molecular plasticizer, and is contained at a weight ratio of 20 to 40 weight % based on the total weight of the sealing material.

3) A sealing material including a high molecular plasticizer, characterized in that the high molecular plasticizer is a polyester of adipic type.

4) A sealing material including a thixotroping agent, characterized in that the thixotroping agent is an organic bentonite or a ultrafine particulate calcium carbonate at a weight ratio of 5 to 10 weight % based on the total weight of the sealing material.

5) A sealing material including a powdery filler, characterized in that the powdery filler has an oil absorption of 40 to 50 cc/100 g.

6) A sealing material including a powdery filler, characterized in that the powdery filler is a calcium carbonate powder having an oil absorption of 40 to 50 cc/100 g and untreated for control of the oil absorption, and is contained at a weight ratio of 25 to 50 weight % on the total weight of the sealing material.

7) A sealing material including an adhesive promoter, characterized in that the adhesive promoter is an amine compound, and is contained at a weight ratio of 0.5 to 3 weight based on the total weight of the sealing material.

The invention will be more clearly understood with reference to the following example.

EXAMPLES

The sealing materials of EXAMPLES 1~12 and comparative examples 1~3 are prepared at the composition and ratios listed in the following Table. As the fine particulate polyvinylchloride type resin, a polyvinylchloride powder having a mean particle size of between 2 and 3 μm, and as the large-particulate polyvinylchloride type resin, a polyvinylchloride powder having a mean particle size of 20 to 30 μm are used. As the plasticizer, either one of deoctyphthalate (DOP) or a polyester of adipic type is used. As the thixotroping agent, an ultrafine particulate calcium carbonate powder having the mean particle size of 0.07 μm is used. As the powdery filler, either one of an untreated $CaCO_3$ powder (the oil absorption of 44 cc/100 g) or a $CaCO_3$ powder treated with an aliphatic acid and having the oil absorption of 33 cc/100 g is used. A polyamide resin as the adhesive promoter, and lead sulfite as the heat stabilizer are used.

| Composition table (wt %) | | | | | | | | |
|---|---|---|---|---|---|---|---|---|
| | Examples | | | | | | | |
| | 1 | 2 | 3 | 4 | 5 | 6 | 7 | 8 |
| A | | | | | | | | |
| A-1 | 10 | 13 | 15 | 10 | 10 | 13 | 10 | 9 |
| A-2 | 10 | 7 | 5 | 10 | 10 | 7 | 10 | 9 |
| D.O.P. | 23 | 23 | 23 | 23 | — | — | — | — |
| B | — | — | — | — | 27 | 27 | 27 | 33 |
| C | 14 | 14 | 14 | 11 | 15 | 15 | 11 | 14 |
| D ($CaCO_3$) | 37 | 37 | 37 | 40 | 32 | 32 | 36 | 30 |
| E ($CaCO_3$) | — | — | — | — | — | — | — | — |
| F | 1 | 1 | 1 | 1 | 1 | 1 | 1 | 1 |
| G | 5 | 5 | 5 | 5 | 5 | 5 | 5 | 4 |
| SUM | 100 | 100 | 100 | 100 | 100 | 100 | 100 | 100 |
| H (CPS/20° C.) | 15500 | 14500 | 13700 | 14600 | 18500 | 17500 | 16700 | 14500 |
| TI | 2.3 | 1.8 | 1.6 | 2.0 | 2.0 | 1.6 | 1.7 | 1.9 |
| I | ○ | ○ | ○ | ○ | ○ | ○ | ○ | ○ |
| J | ○ | ○ | ○ | ○ | ○ | ○ | ○ | ○ |

| | Examples | | | | Comparative | | |
|---|---|---|---|---|---|---|---|
| | 9 | 10 | 11 | 12 | 1 | 2 | 3 |
| A | | | | | | | |
| A-1 | 10 | 13 | 13 | 11 | 13 | 7 | 14 |
| A-2 | 10 | 7 | 7 | 5 | 7 | 12 | 8 |
| D.O.P. | 23 | 23 | 23 | 23 | 27 | 20 | 20 |
| B | — | — | — | — | — | — | — |
| C | 15 | 15 | 11 | 10 | 20 | 15 | 22 |
| D ($CaCO_3$) | — | — | — | — | 28 | 35 | 30 |
| E ($CaCO_3$) | 36 | 36 | 40 | 45 | — | — | — |
| F | 1 | 1 | 1 | 1 | 1 | 2 | 1 |
| G | 5 | 5 | 5 | 5 | 4 | 9 | 5 |
| SUM | 100 | 100 | 100 | 100 | 100 | 100 | 100 |
| H (CPS/20° C.) | 17000 | 15500 | 15000 | 15000 | 15000 | 16500 | 25000 |
| TI | 2.1 | 1.7 | 1.6 | 1.7 | 3.4 | 3.7 | 3.2 |
| I | ○ | ○ | ○ | ○ | ○ | ○ | X |

| | -continued | | | | | | |
|---|---|---|---|---|---|---|---|
| Composition table (wt %) | | | | | | | |
| J | ○ | ○ | ○ | ○ | X | X | ○ |

A: Polyvinylchloride type resin
A-1: Polyvinylchloride type resin; fine particle
A-2: Polyvinylchloride type resin; large particle
B: High molecular plasticizer
C: Thixotroping agent
D: Untreated powdery filler
E: Treated powdery filler
F: Amine type adhesive promoter
G: Heat stabilizer
H: Viscosity at low shearing speed
I: Appearance of a narrow application zone
J: Appearance of a broad application zone The viscosities and TI at 20° C. of the obtained sealing materials are listed in the above composition table. All the viscosities of the sealing materials of EXAMPLES 1~12 (sealing materials of the present invention) are of 12,000 to 20,000 cps, and the TI within the range of 1.5 to 2.5. As for the comparative examples, the viscosities of some sealing materials are within the above range, but all the TI are out of the above range.

The viscosity is measured by use of a extrusion type capillary viscometer. The sealing material placed in the cylinder is pressed by use of the piston, and is extruded from the capillary(the inner diameter designated by d, and the length by l) at a constant flow rate of V/t. The pressure P is measured, and converted to the viscosity according to the following formula:

$$\eta = K \frac{\pi d 4}{l \cdot V/t} \cdot P$$

wherein K is a constant.

The viscosities shown in the above composition table are obtained by measurement at the low shearing speed (62 sec$^{-1}$). The TI are calculated as a ratio of the viscosity at the low shearing speed to the viscosity at the high shearing speed (860 sec$^{-1}$). The shearing speed are calculated from the flow rate according to the following formula:

$$S = \frac{V/t}{\pi d 3}$$

The extrusion type capillary viscometer used complies to a grease apparent viscosity meter as specified by ASTM D-1092, an the flow rate is adjusted to 60 cc/710 sec.

Also, the above composition table shows the state of the appearance of the steel plate joint zone applied with the respective sealing material by a non-contact way. In any one of EXAMPLES 1~12 (the sealing materials of the invention), both appearance. On the contrary, in the case of the comparative examples 1~3, either one of the broad or the narrow joint zone applied has a poor apearance.

In the case of the application to the narrow joint zone, as shown in FIG. 1, a gun nozzle 8 having an aperture of 0.6 to 0.7 mm $\phi$ is positioned perpendicularly to the sealing application works 1 and 2 with the distance between the gun nozzle and the works (the blowing distance) kept at 15 mm. Then, the gun nozzle 8 is moved along the joint zone at 300 mm/sec (application speed), discharging the sealing material 10 therefrom. The extrusion pressure for the discharging is adjusted to an appropriate value within the range of about 10 to about 100 kg/cm$^2$. The resultant applied to narrow joint zone 12 has a width of 6 to 8 mm. It is possible to apply a narrow joint zone in the conditions of the blowing distance of 10 to 20 mm and the application speed of 200 to 400 mm/sec.

Figure 4:
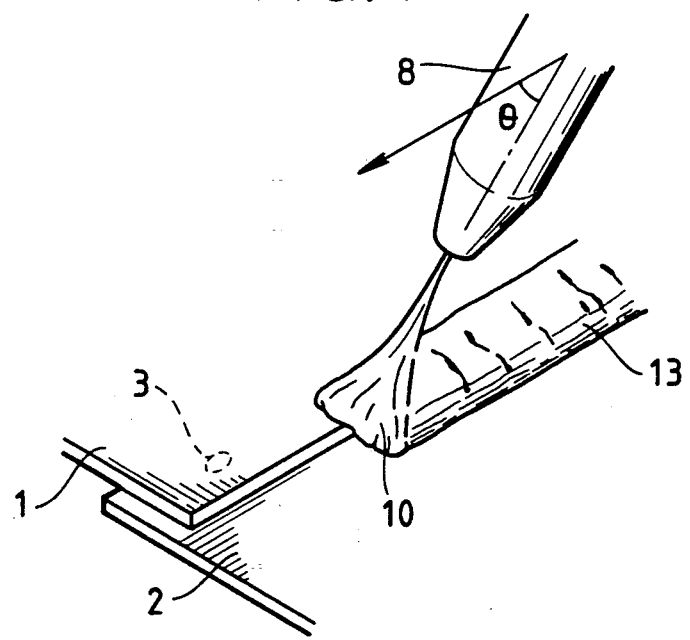
FIG. 4 is a perspective view illustrating that the present sealing material is applied to a broad application zone by a non-contact application way, in which the feature of the sealing material applied to the broad application zone is designated by reference number 13.
Figure 5:
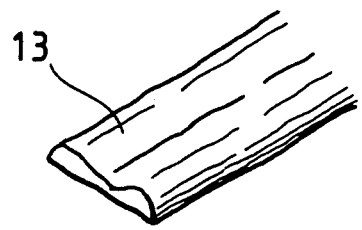

The gun nozzle 8 having a nozzle aperture of 0.6 to 0.7 mm $\phi$ and the application speed which are utilized in the broad joint zone are the same as those in the application of the narrow joint zone. The blowing distance is within the range of 20 to 100 mm, which is longer than that in the narrow joint zone application. As shown in FIG. 4, the nozzle is inclined about 60 degrees ($\theta$) to the movement direction, not inclined laterally of the movement direction. In such positions of the gun nozzle, a broad zone having a width of 13 to 15 mm can be applied.

Figure 2:
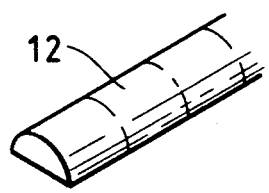
FIGS. 2 and 3 are views illustrating an appearance of a application zone, respectively.
Figure 3:
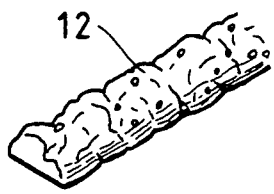

In the above composition table, a circle mark represents that the feature 12 of the joint zone applied with the sealing material is smooth as shown in FIG. 2, and a cross mark that the feature 12 of the zone is concave and convex as shown in FIG. 3.

Figure 6:
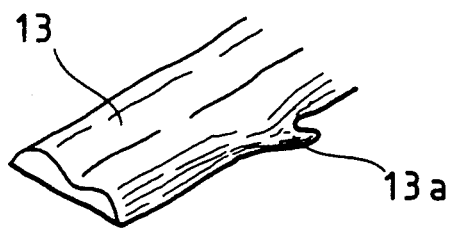
Figure 7:
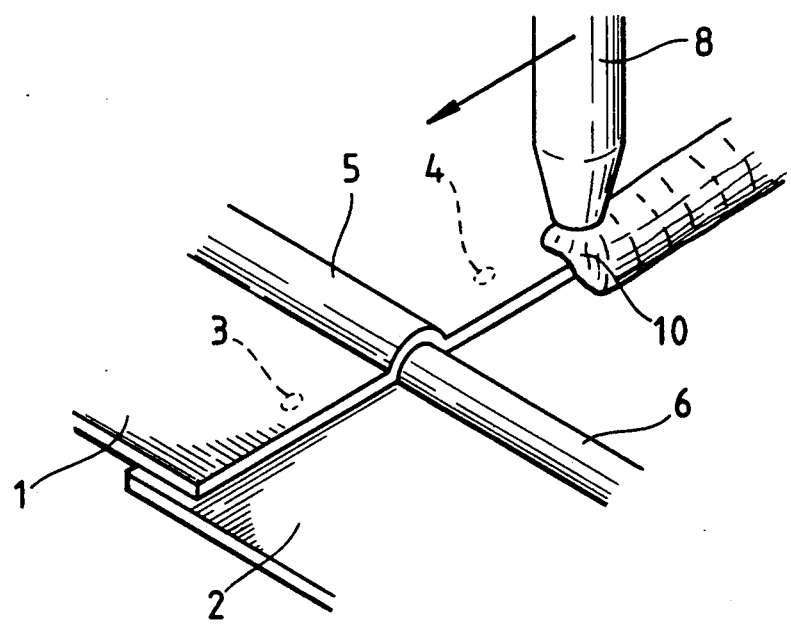
FIG. 7 is a perspective view illustrating that a conventional sealing material is applied by a contact application way.

In the case of the application to the broad joint zone, a circle mark represents that the application feature 13 is smooth without exposed portions of the beads as shown in FIG. 13, and a cross mark that the application feature 13 contains an exposed portion of the beads 13a as shown in FIG. 6.

What is claimed is:

1. A process for applying sealing material for sealing a gap in a substrate for forming a joint zone having a width ranging from 6 to 15 mm, comprising:
   (a) selecting and combining a polyvinyl chloride resin as a major ingredient, a plasticizer, a thixotroping agent, a powdery filler, an adhesive promoter and a heat stabilizer to form the sealing material having viscosity at 20° C. of 12,000 to 20,000 cps at a shearing speed of 62 sec.$^{-1}$, and also having a ratio of the viscosity at the shearing speed of 62 sec.$^{-1}$ to the viscosity at the shearing speed of 860 sec.$^{-1}$ of 1.5 to 2.5 at 20° C., and
   (b) applying the sealing material for sealing the gap by causing extrusion of said material from a nozzle of a sealing gun by means of a robot operated system, at a fixed distance from the substrate upon which the joint zone is to be formed,
   wherein the distance from the nozzle of the sealing gun to the substrate upon which the joint zone is being formed is increased in order to increase the width of the joint zone, the speed at which the gun nozzle is moved along the joint zone is the same regardless of the width of the joint zone, and the nozzle aperture is the same regardless of the width of the joint zone.

2. A process according to claim 1, wherein said plasticizer is at least one compound selected from a group consisting of a di-2-ethylhexyl phthalate, di-2-ethylhexyl adipate, polyester phthalate, polyester adipate, polyester trimellitate and polyester pyromellitate.

3. A process according to claim 1, wherein said thixotroping agent is ultrafine particulate calcium carbonate.

4. A process according to claim 1, wherein said powdery filler is at least one material selected from the group consisting of calcium carbonate, clay, talc and silica.

5. A process according to claim 1, wherein said adhesive promoter is an amine compound.

6. A process according to claim 1, wherein said powdery filler has an oil absorption of 40-50 cc/100 g.

7. A process according to claim 1, wherein said powdery filler is contained in a weight ratio of 25-50 wt % based on the total weight of the sealing material.

8. A process according to claim 1, wherein said adhesive promoter is present in a weight ratio of 0.5-3 wt % based on the total weight of the sealing material.

9. A process according to claim 1, wherein said extrusion pressure for forming said joint zones is from about 10 to about 100 kg/cm$^2$.

10. A process according to claim 1, wherein said extrusion pressure under which the sealing composition is discharged is the same regardless of the width of the joint zone.

11. A process according to claim 1, wherein said joint zone is from 6 to 8 mm.

12. A process according to claim 1, wherein said joint zone is from 13 to 15 mm.

13. A process according to claim 1, wherein said robot operated nozzle is provided with a fixed aperture of from 0.6 to 0.7 mm diameter.

14. A process according to claim 1, wherein when said joint zone is a narrow joint zone said gun nozzle is maintained at a fixed distance of from 10 to 20 mm from the substrate upon which the joint is being formed.

15. A process according to claim 1, wherein when said joint zone is a broad joint zone said gun nozzle is maintained at a fixed distance of from 20 to 100 mm from the substrate upon which the joint is being formed.

* * * * *